(12) United States Patent
Huang

(10) Patent No.: US 10,562,581 B2
(45) Date of Patent: Feb. 18, 2020

(54) STEERING AND LEANING SYSTEM FOR A VEHICLE

(71) Applicants: Kuan-Lung Huang, Tainan (TW); Chia-Jung Chang, Tainan (TW)

(72) Inventor: Kuan-Lung Huang, Tainan (TW)

(73) Assignees: Kuan-Lung Huang, Tainan (TW); Chia-Jung Chang, Tainan (TW)

( * ) Notice: Subject to any disclaimer, the term of this patent is extended or adjusted under 35 U.S.C. 154(b) by 78 days.

(21) Appl. No.: 16/033,508

(22) Filed: Jul. 12, 2018

(65) Prior Publication Data

US 2019/0016405 A1 Jan. 17, 2019

(30) Foreign Application Priority Data

Jul. 13, 2017 (TW) .............................. 106123485 A

(51) Int. Cl.
| | |
|---|---|
| *B62K 5/10* | (2013.01) |
| *B62K 5/08* | (2006.01) |
| *B62D 9/02* | (2006.01) |
| *B62K 5/027* | (2013.01) |
| *B62K 5/05* | (2013.01) |

(52) U.S. Cl.
CPC ................. *B62K 5/10* (2013.01); *B62D 9/02* (2013.01); *B62K 5/027* (2013.01); *B62K 5/05* (2013.01); *B62K 5/08* (2013.01); *B60G 2300/122* (2013.01)

(58) Field of Classification Search
CPC . B62K 5/10; B62K 5/05; B62K 5/027; B62K 5/08; B62D 9/02; B60G 2300/122
See application file for complete search history.

(56) References Cited

U.S. PATENT DOCUMENTS

| | | | | | |
|---|---|---|---|---|---|
| 4,632,413 | A | * | 12/1986 | Fujita ...................... | B60G 3/01 |
| | | | | | 280/124.103 |
| 4,650,213 | A | * | 3/1987 | Fujita ...................... | B62D 9/02 |
| | | | | | 280/124.103 |
| 2011/0006498 | A1 | * | 1/2011 | Mercier ................... | B62D 9/02 |
| | | | | | 280/124.103 |
| 2015/0291241 | A1 | * | 10/2015 | Takano .................... | B62K 5/05 |
| | | | | | 280/5.509 |
| 2016/0137251 | A1 | * | 5/2016 | Mercier ................... | B62K 5/05 |
| | | | | | 180/210 |
| 2017/0088217 | A1 | * | 3/2017 | Ohno .................. | B60G 17/0155 |
| 2018/0265156 | A1 | * | 9/2018 | Hara ...................... | B62D 5/046 |
| 2018/0281886 | A1 | * | 10/2018 | Mizuno .................... | B62K 5/10 |
| 2018/0290684 | A1 | * | 10/2018 | Suda ........................ | B62D 9/04 |
| 2018/0362109 | A1 | * | 12/2018 | Vidolov ................... | B62K 5/10 |
| 2019/0039668 | A1 | * | 2/2019 | Laberge ................... | F01B 21/02 |

\* cited by examiner

*Primary Examiner* — Darlene P Condra

(74) *Attorney, Agent, or Firm* — Muncy, Geissler, Olds & Lowe, P.C.

(57) ABSTRACT

A steering and leaning system for a vehicle includes a steering unit, a driving unit, and a control unit, each of which is adapted to be mounted to a main body of a vehicle. The driving unit is mounted between two spaced-apart front wheels of the main body, and includes an adjusting member that is driven swingably by the steering unit for controlling a moving direction of the vehicle. The control unit includes a control member that is connected movably to the adjusting member such that the swing movement of the adjusting member drives the main body to lean. The control unit is telescopically adjustable to be connected to different height positions on the adjusting member, thereby adjusting a lean angle of the main body.

10 Claims, 7 Drawing Sheets

STEERING AND LEANING SYSTEM FOR A VEHICLE

CROSS-REFERENCE TO RELATED APPLICATION

This application claims priority of Taiwanese Patent Application No. 106123485, filed on Jul. 13, 2017.

FIELD

The disclosure relates to a steering and leaning system, and more particularly to a steering and leaning system for a three-wheeled or four-wheeled vehicle.

BACKGROUND

A conventional motorcycle is a two-wheeled, single-track vehicle that usually has little or no lateral stability when stationary or turning, which can be difficult for those with mobility or balance problems to ride. As an alternative, motorcycle that is three-wheeled or four-wheeled has become desirable for mitigating drawbacks associated with the conventional motorcycle. However, this type of motorcycle may have difficulties making agile turn on the street, as the motorcycle as a whole can no longer lean in a specific direction to flexibly adjust its turning radius. In other words, the turning radius of the three-wheeled or four-wheeled motorcycle is constrained by the rigidness of the motorcycle itself.

SUMMARY

Therefore, an object of the disclosure is to provide a steering and leaning system for a vehicle that can alleviate at least one of the drawbacks of the prior art.

According to the disclosure, the steering and leaning system is adapted for use in a vehicle. The vehicle includes a main body that includes two front wheels spaced-apart from each other in a left-right direction. The steering and leaning system includes a steering unit, a driving unit, and a control unit, each of which is adapted to be mounted to the main body.

The driving unit is adapted to be mounted between the two front wheels of the main body, and includes an adjusting member that is driven swingably by the steering unit for controlling a moving direction of the vehicle. The control unit includes a control member that is connected movably to the adjusting member such that, by virtue of the control unit, the swing movement of the adjusting member drives the main body to lean. The control unit is telescopically adjustable to be connected to different height positions of the adjusting member, thereby adjusting a lean angle of the main body.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
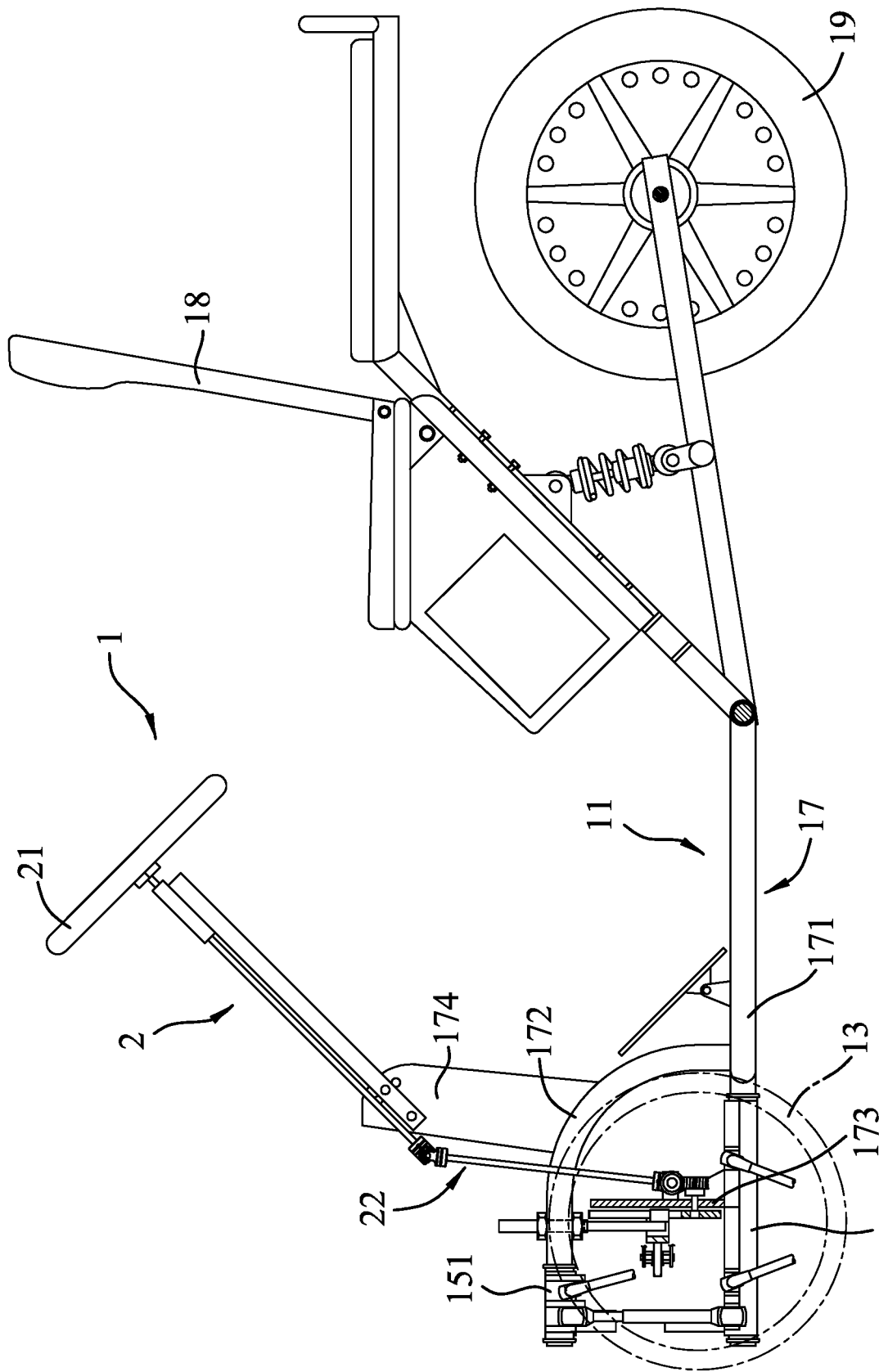
FIG. 1 is a sectional view of an embodiment of a steering and leaning system according to the disclosure mounted to a main body of a vehicle.
Figure 2:
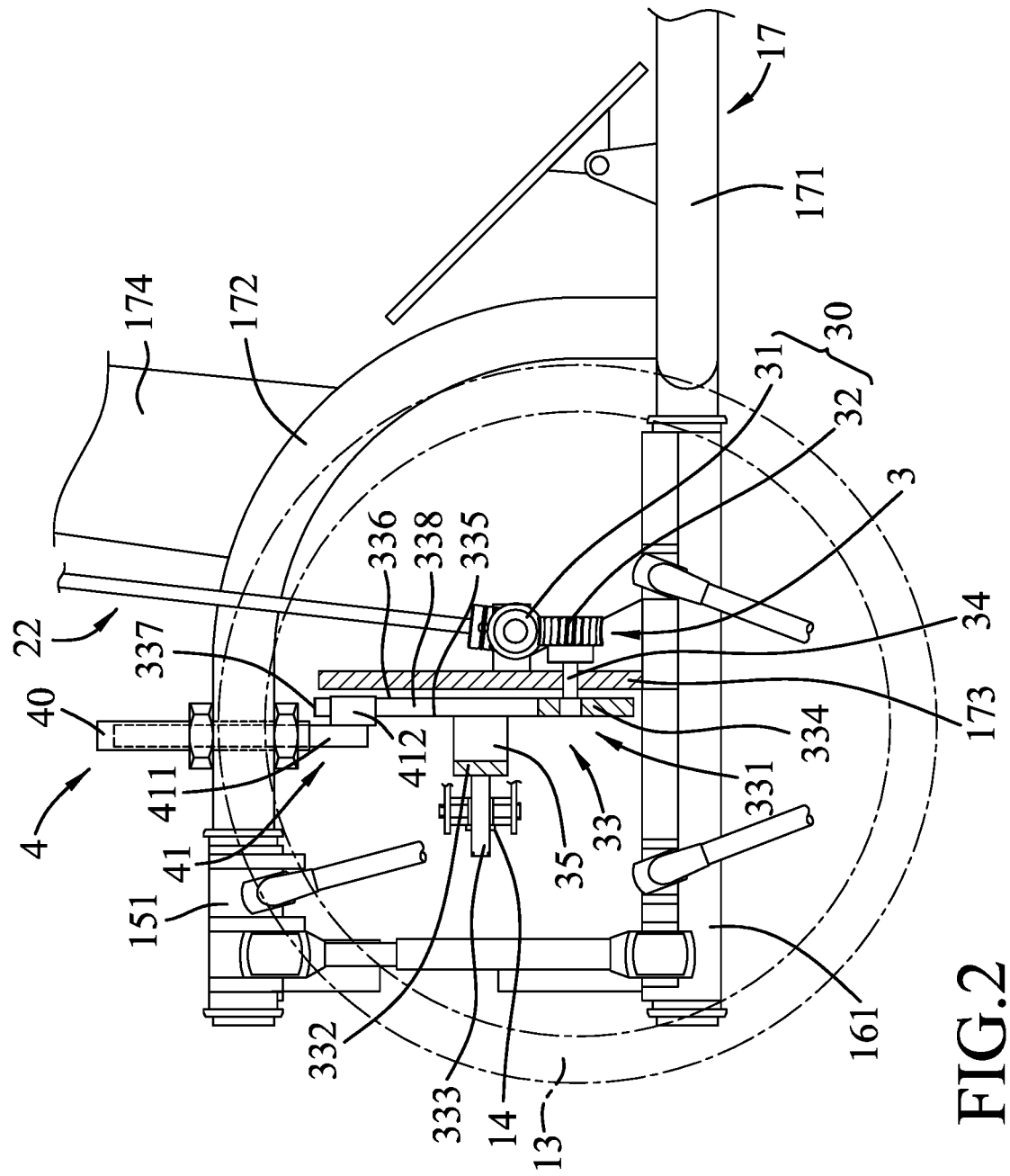
FIG. 2 is a fragmentary enlarged view of FIG. 1.
Figure 3:
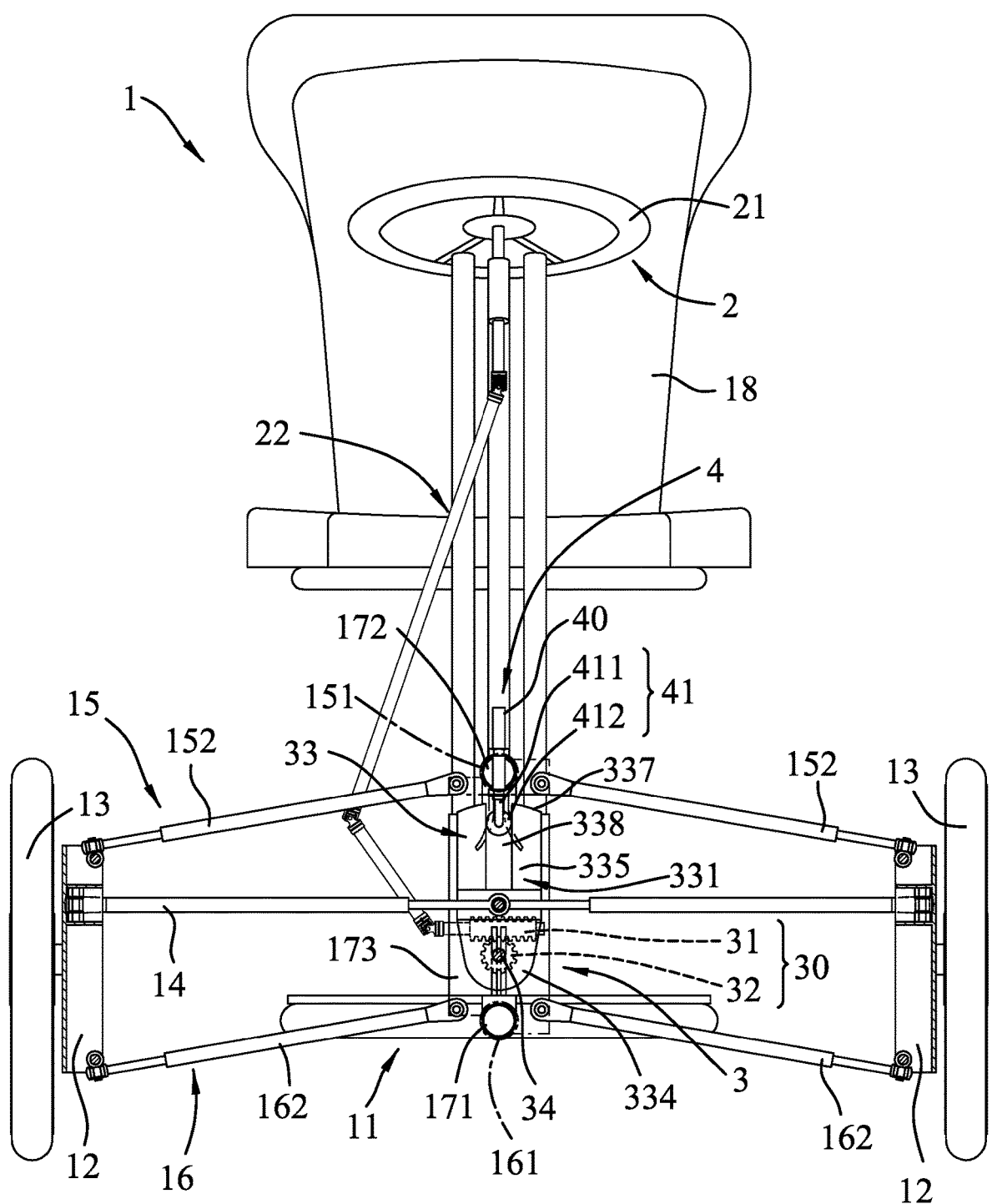
FIG. 3 is a sectional front view of the embodiment.

Referring to FIGS. 1 to 3, an embodiment of a steering and leaning system according to the disclosure is adapted for use in a vehicle 1.

Before the steering and leaning system is described in further details, some elements of the vehicle 1 are defined for the sake of clarity. In this embodiment, the vehicle 1 may be a three-wheeled tadpole motorcycle powered by either fuel and/or electricity. As a three-wheeled tadpole motorcycle, the main body 11 of the vehicle 1 includes two steering arms 12 that are spaced apart from each other in a left-right direction, two front wheels 13, a steering connecting rod 14 that is connected between the front wheels 13, a upper tie rod set 15, a lower tie rod set 16, a front vehicle frame 17, a seat 18, and a rear wheel 19. Each of the front wheels 13 is disposed at and connected to an outer side of a respective one of the steering arms 12. The upper tie rod set 15 includes an upper sleeve 151 that is located between the steering arms 12, and two upper tie rods 152 disposed at opposite sides of the upper sleeve 151. Each of the upper tie rods 152 has one end that is pivotally coupled to the upper sleeve 151, and an opposite end that is pivotally coupled to a top end of a respective one of the steering arms 12. Similarly, the lower tie rod set 16 includes a lower sleeve 161 that is located between the steering arms 12, and two lower tie rods 162. Each of the lower tie rods 162 has one end that is pivotally coupled to the lower sleeve 161, and an opposite end that is pivotally coupled to a bottom end of a respective one of the steering arms 12. The front vehicle frame 17 includes a bottom rod 171, a top rod 172, a first frame board 173 and a second frame board 174. The bottom rod 171 has a front end that is connected to the lower sleeve 161, and extends rearward. The top rod 172 has a front end that is connected to the upper sleeve 151, and steadily curves downward as it extends rearward from the upper sleeve 151 to be connected to the bottom rod 171. The first frame board 173 is upright and is fixedly disposed between the bottom rod 171 and the top rod 172. The second frame board 174 extends upward from the top rod 172. The steering and leaning system is adapted to be mounted to the main body 11, and includes a steering unit 2, a driving unit 3 and a control unit 4.

The steering unit 2 is adapted to be mounted to the main body 11, and includes a handle member 21, and a transmission rod 22 that interconnects the handle member 21 and the driving unit 3. In this embodiment, the handle member 21 is configured as a steering wheel. However, the handle member 21 may be configured as a handlebar in other embodiments. The transmission rod 22 is driven by the handle member 21 to move or to swing in different directions. In order to move or swing more flexibly, the transmission rod 22 in this embodiment includes a plurality of rod members linked together via universal joints. An endmost one of the rod members of the transmission rod 22 is pivotally connected to the second frame board 174 (as shown in FIG. 2).

Figure 4:
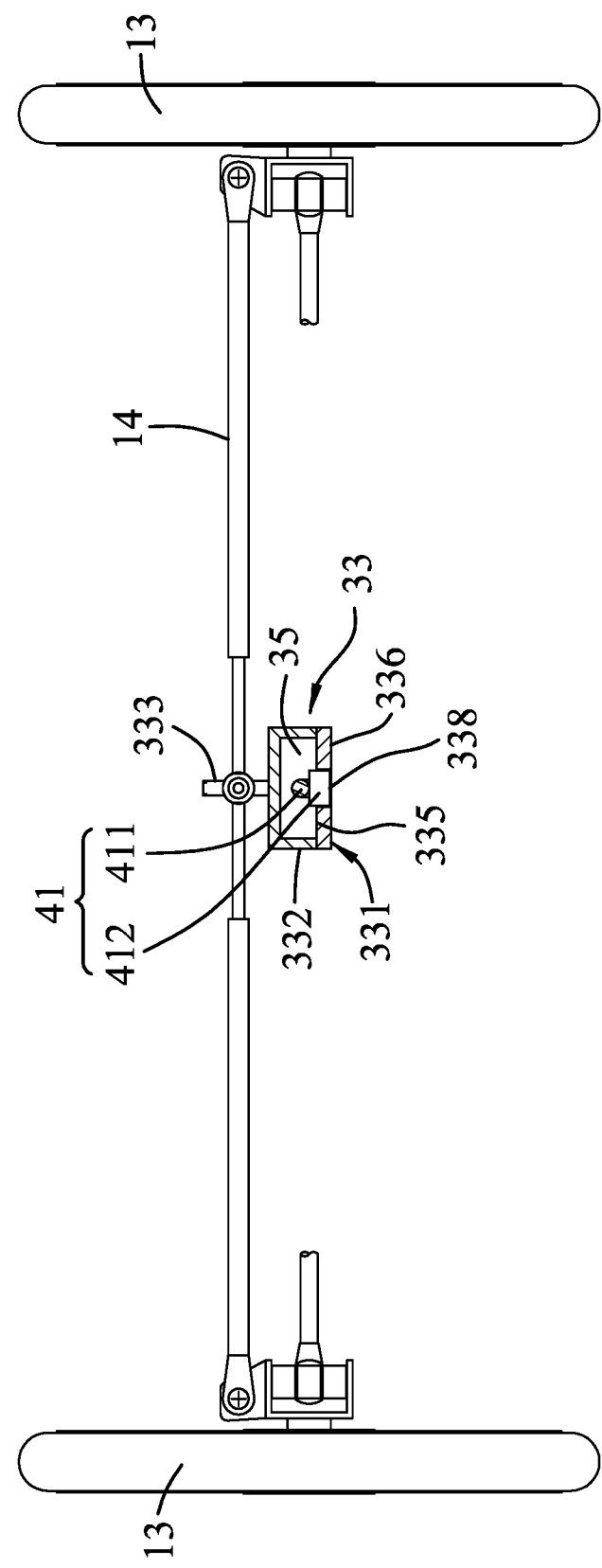
FIG. 4 is a sectional top view of the embodiment, illustrating a main segment of a control member being disposed in a receiving space of an adjusting member.

Referring to FIGS. 2 to 4, the driving unit 3 is adapted to be mounted to the main body 11 between the front wheels 13, and includes a gear subunit 30 and a swingable adjusting member 33. The gear subunit 30 interconnects the steering unit 2 and the adjusting member 33, and includes a first gear 31 that is driven rotatably by the transmission rod 22, and a second gear 32 that meshes with the first gear 31 to transmit torque therefrom. The first gear 31 has an axis of rotation that extends in the left-right direction, and the second gear 32 has an axis of rotation that extends in a front-rear direction. The second gear 32 is connected co-movably to the adjusting member 33 via a coupling rod 34, which extends from the second gear 32 through the first frame board 173 and is connected to the adjusting member 33. As such, the adjusting member 33 is driven swingably by the transmission rod 22 of the steering unit 2 via the gear subunit 30: the rotation of the first gear 31 drives the adjusting member 33 to swing via the second gear 32. The adjusting member 33 includes a flat plate body 331, a receiving body 332 that is connected to a front end of the plate body 331, and a connecting body 333 that is connected to a front end of the receiving body 332 and that is adapted to be connected to the steering connecting rod 14 of the main body 11 of the vehicle 1. The plate body 331 has a front surface 335, a rear surface 336 that is opposite to the front surface 335, a top surface 337 that interconnects the front and rear surfaces 335, 336, and a bottom end portion 334 that has opposite front and rear faces serving respectively as a bottom part of the front surface 335 and a bottom part of the rear surface 336. The coupling rod 34 is connected to the bottom end portion 334 of the plate body 331. The plate body 331 is formed with a groove 338 that is formed from the top surface 337 toward the bottom end portion 334 and that extends through the front and rear surfaces 335, 336. The receiving body 332 cooperates with the plate body 331 to define a receiving space 35.

The control unit 4 includes an elongated casing 40 that is fixedly mounted to the top rod 172 of the front vehicle frame 17, and a control member 41 that is connected to the casing 40 and that is telescopically movable relative to the casing 40 in a top-down direction. The control member 41 includes a main segment 411 that is disposed in front of the adjusting member 33, and a control segment 412 that is inserted movably into the groove 338 of the adjusting member 33. The main segment 411 has a bottom portion disposed in front of and connected to the control segment 412. During a telescopic movement of the control unit 4, the main segment 411 is telescopically movable relative to the casing 40 with the control segment 412 being movable along the groove 338, thereby connecting the control unit 4 to the adjusting member 33 at different height positions. The receiving space 35 is disposed for receiving the main segment 411 during the telescopic movement of the control unit 4. In this embodiment, the control member 41 is configured as a telescopic rod, which has an adjustable length. In other embodiment, the control member 41 may be configured as a hydraulic rod or a threaded rod, and is not limited to such.

Figure 5:
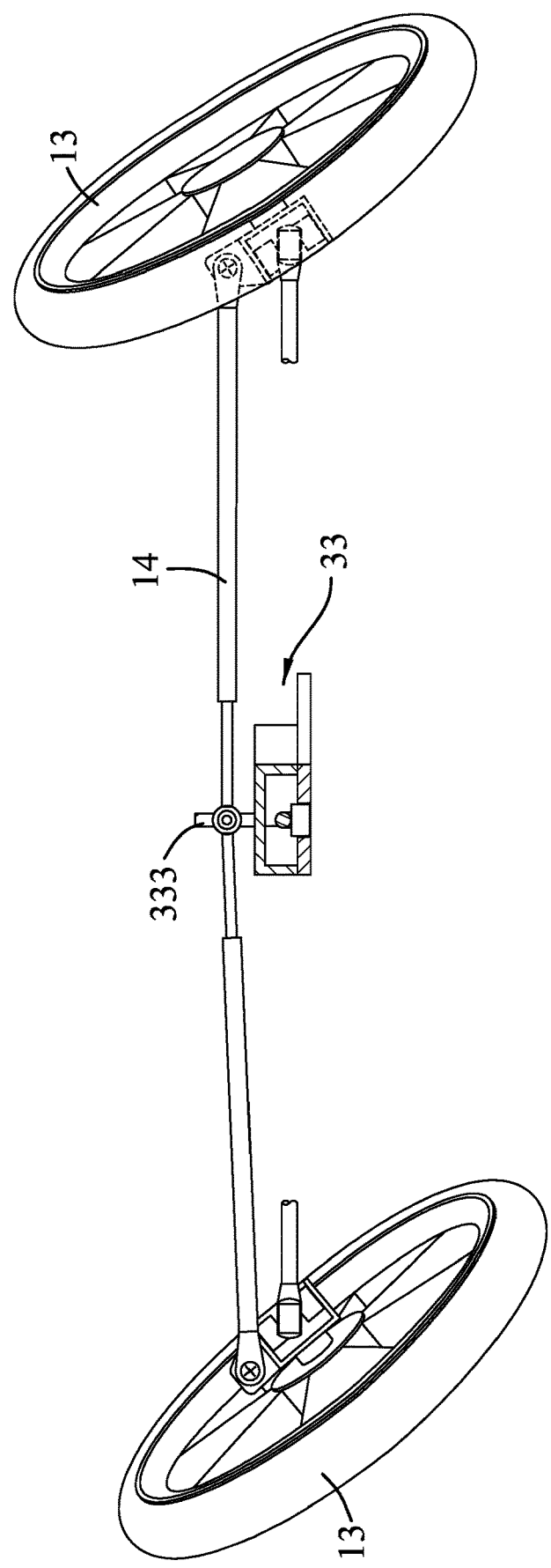
FIG. 5 is another sectional top view of the embodiment, illustrating that, under a swing movement of the adjusting member, two front wheels of the main body of the vehicle lean and a moving direction of the front wheels are changed.

Referring to FIGS. 2 to 5, when a user grips onto and turns the handle member 21, the transmission rod 22 is driven to move and swing. By doing so, the transmission rod 22 drives rotational movements of the first gear 31 and the second gear 32, which in turn drives swing movement of the adjusting member 33. The swing movement of the adjusting member 33 changes a moving direction of the front wheels 13 via the steering connecting rod 14, thereby changing the moving direction of the vehicle 1. Since the steering connecting rod 14 is disposed in front of the rotational axis of the front wheels 13, when the steering connecting rod 14 moves in the left-right direction, the front wheels 13 turn in the left-right direction accordingly. As shown in FIG. 5, when the adjusting member 33 swings to the left, the steering connecting rod 14 is driven to move to the left, and the front wheels 13 are driven to turn left.

Figure 6:
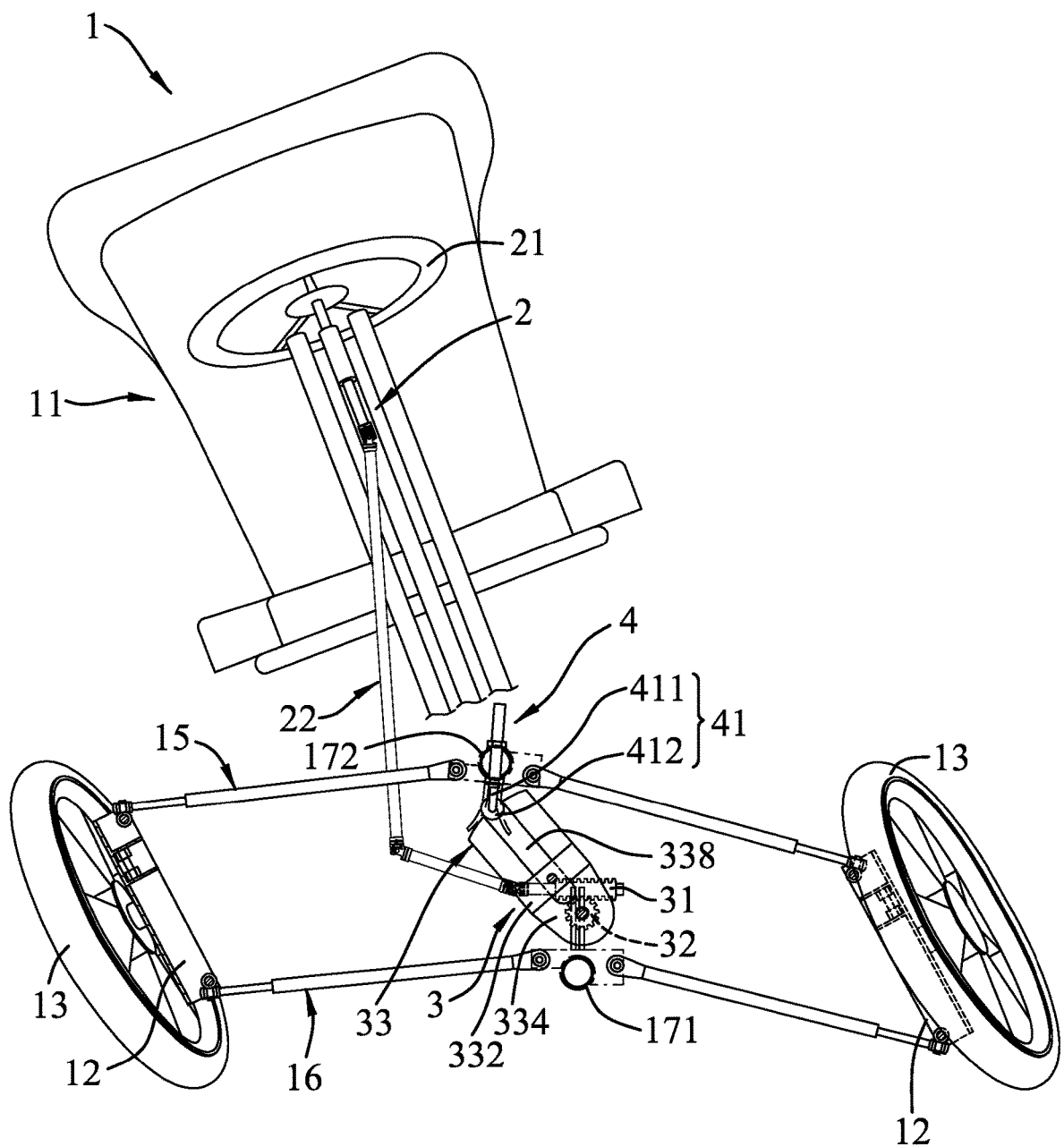
FIG. 6 is another sectional front view of the embodiment, illustrating the swing movement of the adjusting member driving the main body to lean.

Referring to FIGS. 2, 3 and 6, the swing movement of the adjusting member 33, in conjunction with the control member 41, may further adjust a lean angle of the main body 11 of the vehicle 1. Specifically, when the adjusting member 33 swings in the left-right direction, the control unit 4, which is connected to the adjusting member 33 via the control segment 412 of the control member 41, is driven by the adjusting member 33 to move in the left-right direction as well. Since the control unit 4 is mounted to the top rod 172 of the front vehicle frame 17 of the vehicle 1, the top rod 172 is driven by the control unit 4 to transmit the swing movement throughout the front vehicle frame 17, upper tie rod set 15 and the front wheels 13, all of which drive the main body 11 to lean. It should be noted that, as the steering arms 12 are pivotally coupled to the upper tie rod set 15 and the lower tie rod set 16, the main body 11 may be reasonably driven to lean while maintaining balance.

Figure 7:
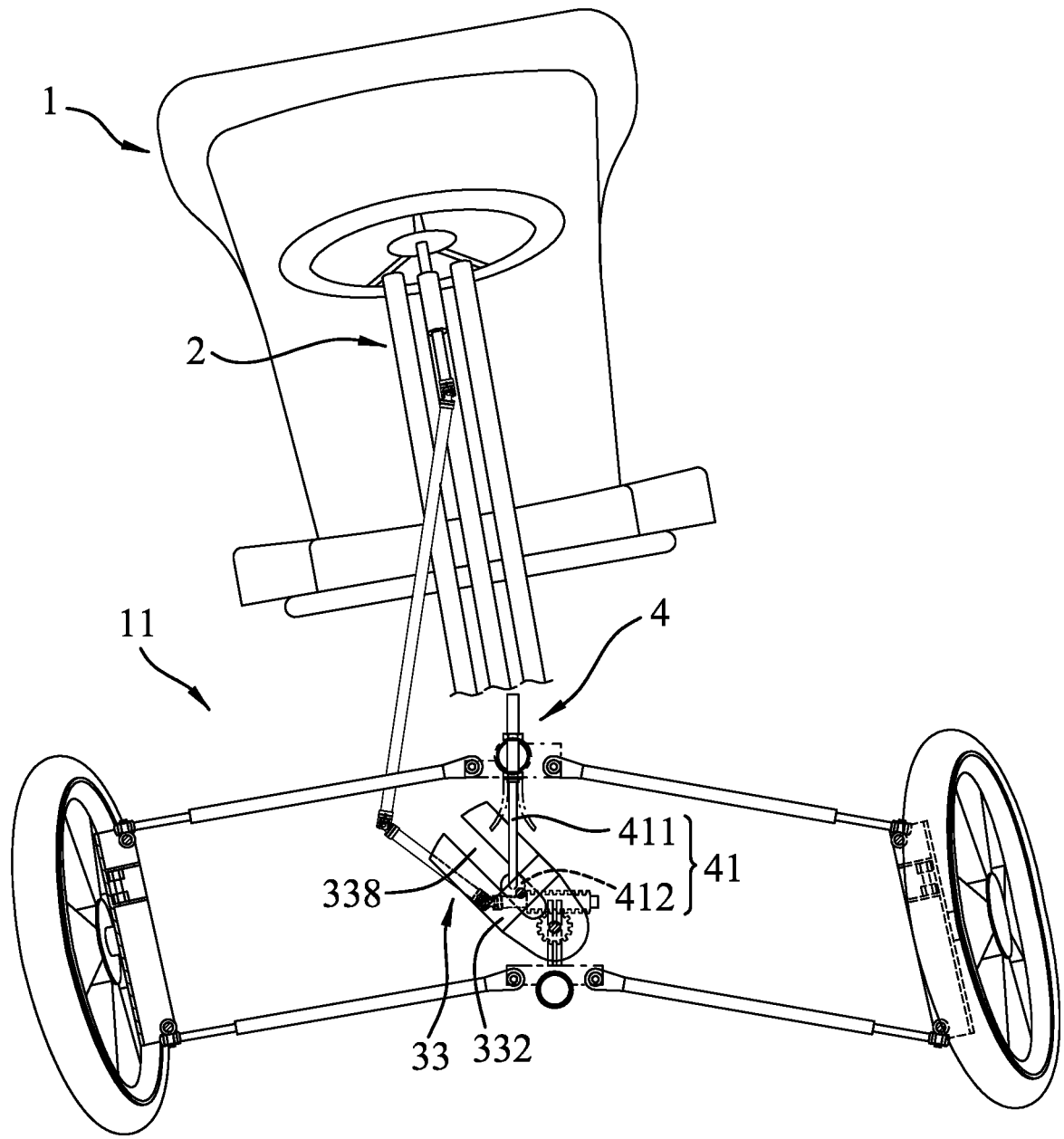
FIG. 7 is a view similar to FIG. 6, but illustrating the control member of the control unit being lowered relative to the adjusting member, thereby lowering a lean angle of the main body.

Referring to FIGS. 2, 6 and 7, the lean angle of the main body 11 can be adjusted by moving the control segment 412 of the control member 41 relative to the adjusting member 33 along the groove 338 of the adjusting member 33. Specifically, when the control segment 412 of the control member 41 is connected to a relatively high position on the adjusting member 333 (shown in FIG. 6), the lean angle of the main body 11, alongside other elements of the vehicle 1 such as the front wheels 13, is greater. Conversely, when the control segment 421 of the control member 41 is moved to a relatively low position on the adjusting member 333 (shown in FIG. 7), the lean angle of the main body 11 becomes smaller. In other words, as the position of the control segment 421 along the groove 338 is dependent on the length of the control unit 4, the user may adjust the lean angle of the main body 11 by simply adjusting the length of the control unit 4, which may be driven by a physical pedal (not shown) or an electric signal.

Overall, with the control unit 4 being telescopically adjustable to be connected to the different height positions of the adjusting member 33 of the driving unit 3, the lean angle of the main body 11 may be easily adjusted, which makes turning of the vehicle 1 much more flexible.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A steering and leaning system adapted for use in a vehicle, the vehicle including a main body that includes two front wheels spaced-apart from each other in a left-right direction, said steering and leaning system comprising:
   a steering unit adapted to be mounted to the main body;
   a driving unit adapted to be mounted to the main body between the front wheels, and including an adjusting member that is driven swingably by said steering unit for controlling a moving direction of the vehicle; and
   a control unit adapted to be mounted to the main body, and including a control member that is connected movably to said adjusting member such that, by virtue of said control unit, the swing movement of said adjusting member drives the main body to lean;
   wherein said control unit being telescopically adjustable to be connected to different height positions on said adjusting member, thereby adjusting a lean angle of said main body.

2. The steering and leaning system as claimed in claim 1, wherein:
   said adjusting member is formed with a groove; and
   said control member has a control segment inserted into said groove, and movable along said groove during the telescopic movement of said control unit.

3. The steering and leaning system as claimed in claim 2, wherein said driving unit further includes a gear subunit interconnecting said steering unit and said adjusting member.

4. The steering and leaning system as claimed in claim 3, wherein said gear subunit includes:
   a first gear driven rotatably by said steering unit; and
   a second gear meshing with said first gear and connected co-movably to said adjusting member, such that rotation of said first gear drives said adjusting member to swing via said second gear.

5. The steering and leaning system as claimed in claim 4, wherein said adjusting member includes a plate body having:
   a front surface;
   a rear surface that is opposite to said front surface;
   a top surface that interconnects said front and rear surfaces; and
   a bottom end portion that is connected to said second gear, and that has opposite front and rear faces serving respectively as a bottom part of said front surface and a bottom part of said rear surface, said groove being formed from said top surface toward said bottom end portion, and extending through said front and rear surfaces.

6. The steering and leaning system as claimed in claim 5, wherein said adjusting member further includes:
   a receiving body that is connected to a front end of said plate body, and that cooperates with said plate body to define a receiving space for receiving said control member during the telescopic movement of said control unit; and
   a connecting body that is connected to a front end of said receiving body, and that is adapted to be connected to a steering connecting rod of the main body of the vehicle which is connected between the front wheels, such that the swing movement of said adjusting member changes a moving direction of the front wheels via the steering connecting rod, thereby changing the moving direction of the vehicle.

7. The steering and leaning system as claimed in claim 2, wherein said control member further has a main segment that has a bottom portion disposed in front of and connected to said control segment.

8. The steering and leaning system as claimed in claim 2, wherein said control member is configured as one of a hydraulic rod, a threaded rod, and a telescopic rod which has an adjustable length.

9. The steering and leaning system as claimed in claim 1, wherein said steering unit includes a handle member, and a transmission rod interconnecting said handle member and said driving unit.

10. The steering and leaning system as claimed in claim 9, wherein said handle member is configured as one of a steering wheel and a handlebar.

* * * * *